United States Patent
Huang et al.

(10) Patent No.: US 10,008,744 B2
(45) Date of Patent: Jun. 26, 2018

(54) LITHIUM ION BATTERY AND ELECTROLYTE THEREOF

(71) Applicant: NingDe Contemporary Amperex Technology Limited, Ningde, Fujian Province (CN)

(72) Inventors: Shilin Huang, Ningde (CN); Kefei Wang, Ningde (CN); Chenghua Fu, Ningde (CN)

(73) Assignee: NingDe Contemporary Amperex Technology Limited (CN)

( * ) Notice: Subject to any disclaimer, the term of this patent is extended or adjusted under 35 U.S.C. 154(b) by 422 days.

(21) Appl. No.: 14/219,956

(22) Filed: Mar. 19, 2014

(65) Prior Publication Data
US 2015/0056500 A1 Feb. 26, 2015

(30) Foreign Application Priority Data

Aug. 23, 2013 (CN) .......................... 2013 1 0372607

(51) Int. Cl.
*H01M 10/0567* (2010.01)
*H01M 10/0525* (2010.01)
*H01M 4/38* (2006.01)
*H01M 4/48* (2010.01)
*H01M 4/587* (2010.01)

(52) U.S. Cl.
CPC ....... *H01M 10/0567* (2013.01); *H01M 4/386* (2013.01); *H01M 4/483* (2013.01); *H01M 4/587* (2013.01); *H01M 10/0525* (2013.01)

(58) Field of Classification Search
None
See application file for complete search history.

(56) References Cited

U.S. PATENT DOCUMENTS

2013/0157124 A1* 6/2013 Hagiyama ........... H01M 10/052
429/200

\* cited by examiner

*Primary Examiner* — Tracy Dove

(57) ABSTRACT

A lithium ion battery electrolyte, comprises lithium salt, a non-aqueous organic solvent and additives. The additives comprise an SEI film forming additive and furil and derivatives thereof, and the SEI film forming additive is at least one of vinylene carbonate, fluoroethylene carbonate and vinyl ethylene carbonate. Compared with the prior art, furil and derivatives thereof are added to the electrolyte as electrolyte additives in the present invention, to enhance the permeability for separator and the wettability for positive/negative electrode materials, facilitate the film forming reaction of the SEI film forming additive, and further improve the cycling performance of the lithium ion battery using the electrolyte. Furthermore, the furil and derivatives thereof have good chemical and electrochemical stability and free from decomposition reaction within the operating voltage range of the lithium ion battery, thereby imparting no negative effect upon battery performances.

6 Claims, No Drawings

LITHIUM ION BATTERY AND ELECTROLYTE THEREOF

FIELD OF THE INVENTION

The present invention belongs to the technical field of lithium ion batteries, and more particularly, relates to a lithium ion battery electrolyte with excellent wettability, and a lithium ion battery containing the electrolyte, which has excellent cycling performance and high-temperature storage performance.

BACKGROUND OF THE INVENTION

A mixed solvent of cyclic carbonate and chain carbonate is used as the non-aqueous organic solvent in the current liquid lithium-ion battery electrolytes; both the cyclic carbonate and the chain carbonate are aprotic solvents with high viscosity and large surface tension, causing small affinity between the electrolyte and the separator material (polyethylene or polypropylene in general), and this separator material is hardly wetted by the electrolyte so as to lead to poor wettability of the electrolyte for the separator, as a result, a large contact resistance is created between the separator and the electrolyte. In addition, the electrolyte is also poor in wettability for electrode materials (i.e. positive and negative electrode materials) to create a large contact resistance between the electrolyte and the electrode material, which accordingly affects the utilization rate of the positive and negative electrode materials and is unfavorable for the functioning of battery capacity.

There are a large number of patent applications (e.g. those with the publication numbers of CN1210833, CN102544582, EP2421081 and CN101465212) in which the technical scheme below has been reported: the wettability of electrolyte is improved by adding nonionic surfactants as wettability additives, such as alkylphenol polyoxyethylene ether, long-chain aliphatic alcohol polyoxyethylene ether, aliphatic acid polyoxyethylene ether, fluorinated alkyl polyoxyethylene ether and silane compounds, etc. In addition, in the patent application CN100442592 for Samsung SDI CO., LTD., the applicant further discloses a lithium ion battery electrolyte containing trialkyl phosphates (nonionic surfactants) and dialkyl carbonates (nonionic surfactants), and the lithium ion battery using the electrolyte has excellent cycling performance and high-temperature stability. The wetting effects of the various aforementioned nonionic surfactants in the electrolyte are bridged together mainly by formation of different intermolecular hydrogen bonding between hydrophobic alkyl and hydrophilic hydroxyl, ether bonds or ester groups in the structure, and the solvent and the separator material (polyethylene, polypropylene, etc.) in the electrolyte, respectively. However, a hydrophilic group is composed of hydroxyls, ether bonds or ester groups, so in order to give molecules with sufficient hydrophilicity to further achieve good wetting effect, the number of hydroxyls, ether bonds or ester groups must be increased, and this will increase the molecular weight of the additive and the viscosity of the electrolyte. Wetting is a dynamic process, and under the same conditions, smaller molecular weight leads to faster wetting, as a result, the wetting effect becomes worse as the molecular weights of the above nonionic surfactants increase. Furthermore, polar group moieties in these nonionic surfactants are all common hydrocarbon structures or carbon-fluorine bonds, carbon-silicon bonds and silicon-oxygen bonds, and tend to have a considerable length, thereby causing worse chemical stability.

In the case that compounds containing a plurality of carbon-oxygen bonds (carbon-oxygen single bonds and carbon-oxygen double bonds) are screened, simple ether, aldehyde, ketone or alcohol compounds may all have wettability, but among the substances listed above, ethers are likely to undergo side reaction in cells, i.e. chain scission, to affect the cycling performance and other performances of the cells; and oxidation of aldehydes, alcohols and common ketones occurs quite easily, so they are all inapplicable for use as the electrolyte additives.

The technical scheme below has been reported in the patent applications with the publication numbers of CN101048912 and CN101702446 patent applications: furanone compounds are used as the electrolyte additives to improve the high-temperature storage performance of cells. These patent applications indicate that furanone compounds are capable of inhibiting electrolyte decomposition and are involved in formation of positive/negative electrode SEI films, and moreover, they do not affect the performances of adhesive materials and do not react with electrode materials or discharging products to cause gas generation during use. However, hydrogen atoms (α-hydrogen) are present on the carbonyl-connected carbon atoms in their molecules, so these compounds are liable to oxidation-reduction to result in unsatisfactory chemical and electrochemical stability.

In addition, since lithium is an alkali metal, it has the characteristics of an oxyphile element; plenty of documents have reported use of crown ether compounds for improving the degree of dissociation and transference number of lithium ions to further improve battery capacity, however, those crown ether compounds, on the one hand, are high in price, and on the other hand, their electrochemical stability is poor, which finally degrades the electrochemical properties of cells seriously.

SUMMARY OF THE INVENTION

An object of the present invention is to provide, based upon the shortcomings in the prior art, a lithium ion battery electrolyte with excellent wettability for both the separator in lithium ion battery and the positive and negative electrode materials. The cycling performance of the lithium ion battery using the electrolyte is significantly improved by adding the lithium ion battery electrolyte with furil and derivatives thereof that have a remarkable promotion effect for the SEI film forming process on the surface of negative electrode active substance.

To reach the object above, adopted in the present invention is a technical scheme below:

A lithium ion battery electrolyte comprises lithium salt, a non-aqueous organic solvent and additives; the additives comprise an SEI film forming additive, and furil and derivatives thereof having the following structural formula,

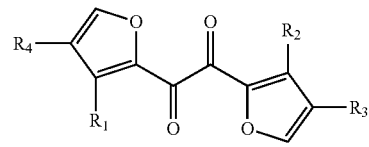

wherein, $R_1$ and $R_2$ are any of hydrogen, fluorine, chlorine and bromine, $R_3$ and $R_4$ are any of alkyl with 1-6 hydrogen atoms and carbon atoms, alkoxy with 1-6 carbon atoms and phenyl, and the SEI film forming additive is at least one of vinylene carbonate, fluoroethylene carbonate and vinyl ethylene carbonate.

Use of a compound containing a plurality of carbon-oxygen bonds (including carbon-oxygen single bonds and carbon-oxygen double bonds) is taken into consideration in the present invention, and the reasons for this are that: 1, this compound contains carbon-oxygen single bond and carbon-oxygen double bond functional groups that are similar to those non-aqueous organic solvents, e.g. ethylene carbonate, propylene carbonate and dimethyl carbonate, and in accordance with the theory of "similarity and intermiscibility", good affinity exists between this compound and solvents. 2, This compound contains a plurality of oxygen atoms in its structure, and is liable to inter-attraction with the separator materials, such as polyethylene and polypropylene, and with the binders in positive and negative electrode materials by means of intermolecular hydrogen bonding action, thus the affinity between the separator and the electrolyte and between the positive and negative electrode materials and the electrolyte is increased.

In the present invention, furil and derivatives thereof are chosen as additives for the lithium ion battery electrolyte. Furil, i.e. difuroyl, contains the major functional group structures of two furanones in one molecule. This unique structure of furil is extremely advantageous for its use as an electrolyte additive, and this is because:

1, In comparison with furanone, there is no hydrogen atom (α-hydrogen) on the carbonyl-connected carbon atoms in molecules, thus, reduction-oxidation of the furil seldom occurs to achieve its good structure stability, besides, it has good chemical and electrochemical stability and small molecular weight and contains two carbonyls and two ether groups, which brings better wetting effect;

2, In the structure of the furil and derivatives thereof in the present invention, oxygen atoms on carbonyls and oxygen atoms on furan rings are capable of chelation with lithium ions to form a stable five-membered or six-membered ring as below:

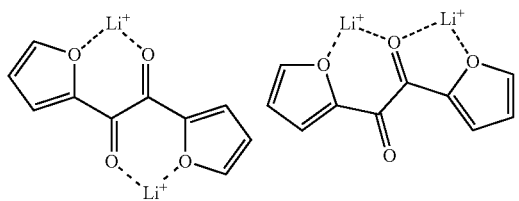

Thus, the degree of dissociaton of lithium salt in the electrolyte can be improved. On this basis, the inventor accidently finds that such structural substances are favorable for the SEI film forming additives (vinylene carbonate (VC), fluoroethylene carbonate (FEC) and vinyl ethylene carbonate (VEC)) to be involved in film forming reaction rapidly, besides, the stability of the formed SEI films is improved to further improve the cycling performance and high-temperature storage performance of the lithium ion battery using the electrolyte.

As an improvement of the lithium ion battery electrolyte in the present invention, the derivative is at least one of 1-(furan-2-yl)-2-(4-(hexyloxy)furan-2-yl)ethane-1,2-dione, 1,2-bis(3-fluorofuran-2-yl)ethane-1,2-dione and 1-(3-fluoro-4-hexylfuran-2-yl)-2-(3-fluorofuran-2-yl)ethane-1,2-dione. These compounds all belong to furil derivatives, their physical and chemical properties are similar to furil, and different $R_1$ and $R_2$ substituents as well as the length of $R_3$ and $R_4$ substituent alkyl chains could affect the dissolvability, stability, thermal property and electrical conductivity of these derivatives. Wherein, 1,2-bis(furan-2-yl)ethane-1,2-dione (i.e. furil, AF-1), 1-(furan-2-yl)-2-(4-(hexyloxy)furan-2-yl)ethane-1,2-dione (AF-2), 1,2-bis(3-fluorofuran-2-yl)ethane-1,2-dione (AF-3) and 1-(3-fluoro-4-hexylfuran-2-yl)-2-(3-fluorofuran-2-yl)ethane-1,2-dione (AF-4) have the structural formulae below:

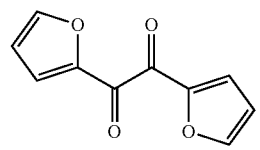

AF-1

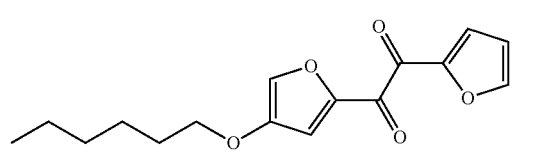

AF-2

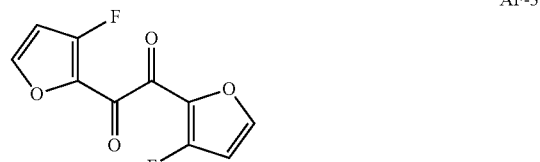

AF-3

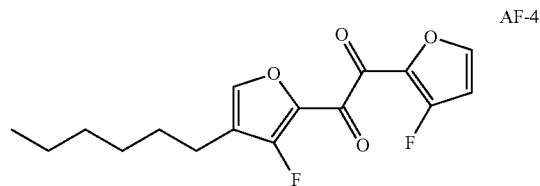

AF-4

As an improvement of the lithium ion battery electrolyte in the present invention, the content of the furil and derivatives thereof in the electrolyte is 0.1%-5% by weight. When the addition amount of the furil and derivatives thereof is smaller than 0.1%, no obvious improvement effect for the cycling performance of the battery is found; and when the addition amount exceeds 5%, the dissolvability of the additives in the electrolyte is small, so complete dissolution is difficult to accomplish.

As an improvement of the lithium ion battery electrolyte in the present invention, the content of the furil and derivatives thereof in the electrolyte is 1%-4% by weight. More preferably, the content of the furil and derivatives thereof in the electrolyte is 3% by weight, and this content of the furil and derivatives thereof brings the most obvious improvement effect for the cycling performance of the battery.

As an improvement of the lithium ion battery electrolyte in the present invention, the content of the SEI film forming additive in the electrolyte is 0.1%-20% by weight. When the content of the SEI film forming additive is too low, the SEI films that are formed on negative electrode surface during formation are not compact enough, which could affect the high-temperature storage performance of the battery; and when the content of the SEI film forming additive is too high, internal resistance in the battery will be increased.

As an improvement of the lithium ion battery electrolyte in the present invention, the content of the SEI film forming additive in the electrolyte is 1%-10% by weight.

Wherein, the lithium salt is at least one of hexafluorophosphate, lithium tetrafluoroborate, hexafluoroarsenate, lithium perchlorate, lithium trifluorosulfonyl, lithium bis(trifluoromethanesulfonyl)imide, lithium bis(fluorosulfonyl)imide and lithium tris(trifluoromethylsulfonyl)methyl.

The lithium salt has a concentration of 0.7M-1.3M. An extremely low concentration of the lithium salt leads to low electrical conductivity of the electrolyte, which further affects the rate and cycling performance of the entire battery system; and an extremely high concentration of the lithium salt leads to too large viscosity of the electrolyte, which also affects the rate of the entire battery system. Preferably, the lithium salt has a concentration of 1M.

The non-aqueous organic solvent is at least two of ethylene carbonate (EC), propylene carbonate (PC), dimethyl carbonate (DMC), diethyl carbonate (DEC), ethyl methyl carbonate (EMC), γ-butyrolactone (BL), methyl formate (MF), methyl acetate (MA), ethyl propionate (EP) and tetrahydrofuran (THF).

Compared with the prior art, furil and derivatives thereof are added to the electrolyte as additives in the present invention, this can reduce the surface tension of the electrolyte remarkably and enhance the permeability for separator and the wettability for positive/negative electrode materials, thereby effectively reducing the contact resistance between the electrolyte and the separator and between the electrolyte and the electrode materials, and further improving the cycling performance of the lithium ion battery using the electrolyte. In addition, the furil and derivatives thereof are capable of increasing the stability of the formed SEI films to improve the cycling performance and high-temperature storage performance of the lithium ion battery using the electrolyte. Furthermore, the furil and derivatives thereof have good chemical and electrochemical stability and are free from decomposition reaction within the operating voltage range of the lithium ion battery, so there is no negative effect upon battery performances.

The furil and derivatives thereof can enhance the permeability of the electrolyte for separator and the wettability of the electrolyte for positive/negative electrode materials, this is because the furil and derivatives thereof contain a plurality of hydrophilic carbonyl and ether functional groups in the structure thereof, have the structural characteristics of nonionic surfactants, and are liable to formation of hydrogen bonding with organic and inorganic substances in electrodes and also liable to formation of hydrogen bonding with separator. For example, the furil and derivatives thereof and a binder styrene butadiene rubber (SBR) can form the following intermolecular hydrogen bonding:

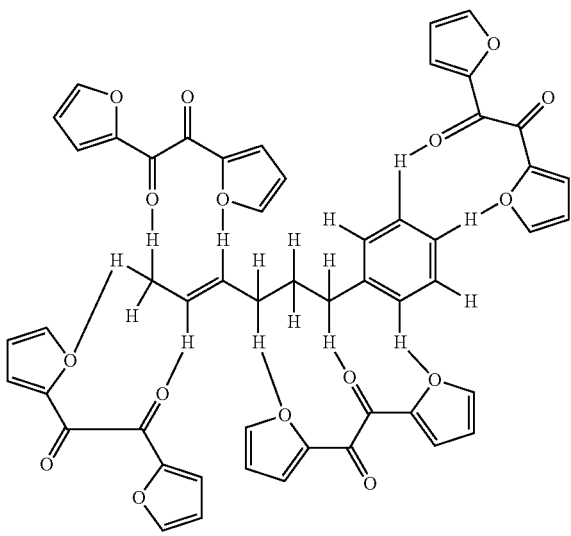

And the furil and derivatives thereof and a separator (a PP-made separator is taken as example) can form the following intermolecular hydrogen bonding:

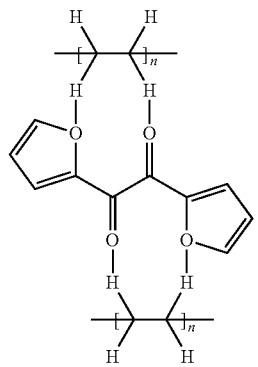

The furil and derivatives thereof contain a plurality of hydrogen bonding active sites in just one molecule and can form intermolecular hydrogen bonding with binders like styrene butadiene rubber (SBR), and with separators (PE, PP), active oxygen atoms are connected through adjacent carbon atoms to finally form a chelate ring, and the presence of chelation enhances intermolecular affinity once again, allowing the wettability of the electrolyte for electrodes and separators to be improved greatly.

In a word, furil and derivatives thereof can enhance the affinity between the separator material and the electrolyte and between the electrode materials and the electrolyte by means of hydrogen bonding, act as a bridge between the separator material and the electrolyte and between the electrode materials and the electrolyte, and improves the wettability of the electrolyte for electrodes, thus the wetting time of the electrolyte from injection to formation can be effectively reduced, and the cost is lowered; furthermore, furil and derivatives thereof can also reduce the surface tension of the electrolyte and simultaneously improve the uniformity of the SEI films, besides, they are small in polarization, resulting in improvement for the low-temperature performance of cells.

It shall be noted that, carbonyl oxygen tends to the formation of hydrogen bonding; and although ethylene carbonate and the like in the solvent can also form a certain degree of hydrogen bonding with separator and electrodes, the action of hydrogen bonding is still very weak because only one hydrogen bonding active site is present on the molecules.

Besides the fact that furil and derivatives thereof can improve the wettability of the electrolyte for electrodes and separator, the inventor of the present invention accidentally finds in an SEI film forming additive-containing electrolyte system that: furil and derivatives thereof also play a role of promoting film formation for those SEI film forming additives ((vinylene carbonate (VC), fluoroethylene carbonate (FEC) and vinyl ethylene carbonate (VEC)). The inventor believes that, VC, FEC and VEC all have similar cyclic carbonate structures and these substances having the cyclic carbonate structures have lower reduction decomposition potentials than furil and derivatives thereof, as a result, the furil and derivatives thereof, after forming a five-membered or six-membered ring through chelation with lithium ions, will create a "substrate" layer on the surface of the negative electrode active substance earlier than those SEI film forming additives having the cyclic carbonate structures during the battery formation process, and when those SEI film forming additives having the cyclic carbonate structures are involved in film forming reaction, SEI films with better compactness and higher ion conductivity will be formed owing to chelation of a large number of lithium ions in the "substrate" layer. It is found through the comparison between long-term cycling experiments that, addition of the furil and derivatives thereof results in a great improvement on the stability of the SEI films formed on the surface of the negative electrode active substance, thus the cycling performance is improved.

Another object of the present invention is to provide a lithium ion battery, comprising a positive electrode, a negative electrode, a separator arranged between the positive electrode and the negative electrode, and an electrolyte; the positive electrode comprises a positive electrode current collector and a positive electrode active substance layer arranged on the positive electrode current collector; the positive electrode active substance layer comprises a positive electrode active substance, a binder and a conductive agent; the negative electrode comprises a negative electrode current collector and a negative electrode active substance layer arranged on the negative electrode current collector; the negative electrode active substance layer comprises a negative electrode active substance, a binder and a conductive agent; and the electrolyte is the lithium ion battery electrolyte of the present invention.

As an improvement of the lithium ion battery electrolyte in the present invention, the negative electrode active substance at least contains graphite.

As an improvement of the lithium ion battery electrolyte in the present invention, the negative electrode active substance at least contains silicon or oxides thereof.

The positive electrode active substance is at least one of $LiCoO_2$, $LiMn_2O_4$ and $Li(Co_xNi_yMn_{1-x-y})O_2$, wherein $0.3 \leq x \leq 0.8$, $0.1 \leq y \leq 0.4$ and $0.6 \leq x+y \leq 0.9$; both the binder and the conductive agent are substances used in the prior art, for example, the binder may be PVDF, SBR or CMC, and the conductive agent may be superconductive carbon, carbon nanotube, graphene and carbon nanofiber, etc.

Compared with the prior art, the lithium ion battery electrolyte in the present invention is added with SEI film forming additives and furil and derivatives thereof, and therefore has excellent electrochemical performance and cycling performance.

DETAILED DESCRIPTION OF THE EMBODIMENTS

For a better clarity of the objects, technical scheme and advantageous technical effects of the present invention, the present invention will be further illustrated below in details in conjunction with the embodiments and comparative examples. It shall be understood that, the embodiments described in this description are for illustrative purposes only, rather than limitation to the present invention, and those formulae, ratios and the like in the embodiments could be tailored according to circumstances without causing any substantial effects.

Provided in the present invention is a lithium ion battery electrolyte.

Embodiment 1

Provided in this embodiment is a lithium ion battery electrolyte, comprising lithium salt, a non-aqueous organic solvent and additives, wherein the lithium salt is $LiPF_6$ and has a concentration of 1M; the solvent is a mixture of dimethyl carbonate (DMC), ethylene carbonate (EC) and propylene carbonate (PC), with the mass ratio thereof being 1:1:1; the additives are 1,2-bis(furan-2-yl)ethane-1,2-dione (AF-1) and vinyl ethylene carbonate, the content of AF-1 in the electrolyte is 1% by weight, and the content of vinyl ethylene carbonate in the electrolyte is 0.1% by weight.

Electrolyte composition in embodiments 2-13 and comparative examples 1-5 is shown in Table 1:

TABLE 1

Electrolyte composition in the embodiments 1-13 and the comparative examples 1-5

| Group | Solvent and mass ratio thereof | | Additive and content thereof in percentage | | | Lithium salt |
|---|---|---|---|---|---|---|
| Embodiment 1 | DMC:PC:EC | 1:1:1 | AF-1, 1% | VC, 0.1% | | LiPF6 |
| Embodiment 2 | DMC:PC:EC | 1:1:1 | AF-2, 1% | VC, 0.1% | | LiPF6 |
| Embodiment 3 | DMC:PC:EC | 1:1:1 | AF-3, 1% | VC, 0.1% | | LiPF6 |
| Embodiment 4 | DMC:PC:EC | 1:1:1 | AF-4, 1% | VC, 0.1% | | LiPF6 |
| Embodiment 5 | DMC:PC:EC | 1:1:1 | AF-1, 1% | FEC, 1% | | LiPF6 |
| Embodiment 6 | DMC:PC:EC | 1:1:1 | AF-2, 1% | FEC, 1% | | LiPF6 |
| Embodiment 7 | DMC:PC:EC | 1:1:1 | AF-3, 1% | FEC, 1% | | LiPF6 |
| Embodiment 8 | DMC:PC:EC | 1:1:1 | AF-4, 1% | FEC, 1% | | LiPF6 |
| Embodiment 9 | EMC:DMC:EC:MA | 1:1:0.7:0.1 | AF-3, 4% | VC, 10% | FEC, 3% | LiBF4 |
| Embodiment 10 | EMC:DMC:EC:MA | 1:1:0.7:0.1 | AF-3, 5% | VC, 10% | VEC, 10% | LiBF4 |
| Embodiment 11 | DMC:PC:EC | 1:1:1 | AF-3, 1% | FEC, 0.1% | | LiPF6 |
| Embodiment 12 | DMC:PC:EC | 1:1:1 | AF-3, 1% | VEC, 2% | | LiPF6 |
| Embodiment 13 | EMC:DMC:EC:MA | 1:1:0.7:0.1 | AF-3, 0.1% | FEC, 12% | | LiBF4 |
| Comparative example 1 | DMC:PC:EC | 1:1:1 | | VC, 0.1% | | LiPF6 |
| Comparative example 2 | DMC:PC:EC | 1:1:1 | | FEC, 1% | | LiPF6 |
| Comparative example 3 | DMC:PC:EC | 1:1:1 | | VEC, 2% | | LiPF6 |
| Comparative example 4 | DMC:PC:EC | 1:1:1 | AF-3, 10% | VC, 0.1% | | LiPF6 |
| Comparative example 5 | DMC:PC:EC | 1:1:1 | AF-3, 1% | | | LiPF6 |

The test below is conducted on the electrolytes in the embodiments 1-8 and the comparative examples 1-5:

Evaluation on the wettability of the electrolyte: the wettability of the electrolyte in the present invention can be evaluated using the several methods below:

(1) Evaluation is achieved by testing the surface tension (measured by a surface tension meter) of an electrolyte sample at 25° C., and smaller surface tension means better wettability.

(2) The wetting time refers to the time for the electrolyte to disappear after poured on the surface of a negative electrode in drops, and the smaller the time for the electrolyte to disappear is, the better the wettability of the electrolyte becomes.

Test results are shown in Table 2.

TABLE 2

Wettability test results of the electrolytes in the comparative examples 1-4 and the embodiments 1-8

| Group | Surface tension (mN/m) | Wetting time (s) |
|---|---|---|
| Embodiment 1 | 26.1 | 60 |
| Embodiment 2 | 22.7 | 61 |
| Embodiment 3 | 23.5 | 55 |
| Embodiment 4 | 24 | 64 |
| Embodiment 5 | 27.6 | 63 |
| Embodiment 6 | 27 | 60 |
| Embodiment 7 | 23.6 | 59 |
| Embodiment 8 | 24.1 | 56 |
| Comparative example 1 | 40.2 | 92 |
| Comparative example 2 | 41 | 96 |
| Comparative example 3 | 38 | 88 |
| Comparative example 4 | 22.0 | 53 |

It is clear from Table 2 that, compared with the electrolytes without addition of the furil and derivatives thereof in the comparative examples 1-3, the electrolytes in the embodiments with the furil and derivatives thereof being added are remarkably reduced in the aspects of surface tension and wetting time. This suggests that furil and derivatives thereof can improve the wettability of the electrolyte for separator and electrodes. And it is clear from the comparison results between the embodiments 1-4 and the comparative example 4 that: while a large number of furil derivatives are added to the electrolyte in the comparative example 4, improvement on the wetting effect is still limited.

Further provided in the present invention is a lithium ion battery.

Embodiment 14

The lithium ion battery provided in this embodiment comprises a positive electrode, a negative electrode, a separator arranged between the positive electrode and the negative electrode, and an electrolyte; the positive electrode comprises a positive electrode current collector and a positive electrode active substance layer arranged on the positive electrode current collector; the positive electrode active substance layer comprises a positive electrode active substance, a binder and a conductive agent; the negative electrode comprises a negative electrode current collector and a negative electrode active substance layer arranged on the negative electrode current collector; the negative electrode active substance layer comprises a negative electrode active substance, a binder and a conductive agent, wherein the positive electrode active substance is $LiCoO_2$, the negative electrode active substance is graphite, and the electrolyte is the lithium ion battery electrolyte provided in the embodiment 1.

Embodiments 15-21

The difference between these embodiments and the embodiment 14 is that: the electrolytes are the lithium ion battery electrolytes provided in the embodiments 2-8, and other parts in these embodiments are the same as the embodiment 14, thus description is not repeated herein.

Embodiments 22-23

The difference between these embodiments and the embodiment 14 is that: the positive electrode active substance is $LiMn_2O_4$, the negative electrode active substance is $SiO_x$ (1.6≤x≤2.0), the electrolytes are respectively the lithium ion battery electrolytes provided in the embodiments 9-10, and other parts in these embodiments are the same as the embodiment 14, thus description is not repeated herein.

Embodiments 24-26

The difference between these embodiments and the embodiment 14 is that: the positive electrode active substance is $Li(Co_{1/3}Ni_{1/3}Mn_{1/3})O_2$, the negative electrode active substance is silicon, the electrolytes are the lithium ion battery electrolytes provided in the embodiments 11-13, and other parts in these embodiments are the same as the embodiment 14, thus description is not repeated herein.

Comparative Examples 6-10

The difference between these comparative examples and the embodiment 14 is that: the electrolytes are the lithium ion battery electrolytes provided in the comparative examples 1-5, and other parts in these comparative examples are the same as the embodiment 14, thus description is not repeated herein.

The test below is conducted on the batteries in embodiments 14-23 and comparative examples 6-10:

The batteries provided in the embodiments 14-23 and the comparative examples 6-10 undergo a performance test after being stored for 24 hours at 85° C., and also undergo a 45° C. cycling test.

Wherein, the following specific operations are involved in the high-temperature storage test: the batteries provided in the embodiments 14-23 and the comparative examples 6-10 are charged to 4.2V using 0.5 C-rate constant current and then placed for 24 hours at 85° C., the thickness swelling rate, the internal resistance increasing rate, the remaining capacity and the recovery capacity of the batteries are measured, and results are shown in Table 3.

The 45° C. cycling test is as follows: under room temperature, the batteries provided in the embodiments 14-23 and the comparative examples 6-10 are charged to 4.2V using 0.5 C-rate constant current, then charged under constant voltage to obtain 0.05 C current, and discharged to 3.0 V using 0.5 C constant current, this charging/discharging procedure is repeated, the capacity retention rates of the batteries after cycling 100 times, 200 times and 300 times are calculated respectively, and results are shown in Table 3.

Calculation on the capacity retention rate: capacity retention rate of the corresponding cycling=(discharge capacity of the corresponding cycling/discharge capacity of the first cycling)×100%.

TABLE 3

High-temperature storage and 45° C. cycling test results of the batteries in the embodiments 14-23 and the comparative examples 6-10

| | Stored for 24 hours at 85° C. | | | | Capacity retention rate after 45° C. cycling n times/% | | |
|---|---|---|---|---|---|---|---|
| Group | Thickness swelling rate/% | Internal resistance increasing rate/% | Remaining capacity/% | Recovery capacity/% | Cycling 100 times | Cycling 200 times | Cycling 300 times |
| Embodiment 14 | 6.8 | 14.1 | 87.7 | 90.9 | 90.4 | 85.5 | 82.3 |
| Embodiment 15 | 5.3 | 13.4 | 88.1 | 91.9 | 93.5 | 90.3 | 88.2 |
| Embodiment 16 | 3.2 | 12.3 | 90.6 | 92.6 | 94.5 | 91.5 | 90.4 |
| Embodiment 17 | 9 | 16.1 | 83.5 | 87.1 | 89.9 | 84.3 | 81.7 |
| Embodiment 18 | 6.4 | 13.2 | 82.3 | 85.3 | 84.8 | 80.2 | 79.3 |
| Embodiment 19 | 5.0 | 12.6 | 82.6 | 86.2 | 87.7 | 84.7 | 82.7 |
| Embodiment 20 | 3.0 | 11.5 | 85.0 | 86.9 | 88.6 | 85.8 | 84.8 |
| Embodiment 21 | 8.4 | 15.1 | 79.4 | 83.5 | 84.3 | 79.1 | 77.7 |
| Embodiment 22 | 1.6 | 4.7 | 92.1 | 94.6 | 95.6 | 92.1 | 90.8 |
| Embodiment 23 | 1.5 | 3.2 | 91.2 | 93.8 | 94.3 | 91.9 | 88.6 |
| Comparative example 6 | 11.3 | 20.4 | 78.5 | 82.3 | 83.2 | 79.5 | 72.0 |
| Comparative example 7 | 10.6 | 17.9 | 73.6 | 77.2 | 78.0 | 74.6 | 70.5 |
| Comparative example 8 | 10.3 | 18.4 | 76.5 | 80.3 | 80.2 | 78.2 | 70.9 |
| Comparative example 9 | 14.8 | 25.3 | 71.6 | 72.3 | 76.5 | 70.4 | 65.5 |
| Comparative example 10 | 20.1 | 29.8 | 64.2 | 68.6 | 72.1 | 66.7 | 60.2 |

According to the comparison between the embodiments 14-17 and the embodiments 18-21 in Table 3, the batteries with halogen (F)-containing furil added to their electrolytes (embodiments 15 and 16, embodiments 19 and 20) have the long-term cycling performance slightly better than the batteries with halogen-free furil added to their electrolytes (embodiments 14 and 17, embodiments 18 and 21). Besides, furil derivatives with long branched chains are a little less helpful to cycling performance than those with short branched chains. The inventor who has conducted deep analysis and research on this phenomenon generally believes that common halogen-substituted solvents are good in film forming effect, thus, the halogen substituent-containing furil may have a film forming effect similar to common SEI film forming additives. On the other hand, substituents in those short branched chains will enhance the stability of the whole structure after film formation, while substituents in those long branched chains hardly form a stable structure because of strong polarity.

Upon summarization of the aforementioned experiments and the existing experience, the inventor believes that furil and derivatives thereof indeed have a weak film forming effect, but according to the experimental results of the embodiments 14-21 and the comparative example 10, independent use of the furil and derivatives thereof fails to acquire a film forming effect similar to that of the SEI film forming additives. When the furil and derivatives thereof and the SEI film forming additives having the cyclic carbonate structures are used together, the furil and derivatives thereof show their film forming effect earlier than the SEI film forming additives having the cyclic carbonate structures, and simultaneously, a large number of lithium ions are attached to the film forming sites on the surface of the negative electrode active substance together and a "substrate" layer is formed, making adequate preparations for the film forming process of the SEI film forming additives having the cyclic carbonate structures. SEI films with high stability and good lithium ion conductivity are formed on the surface of the negative electrode active substance after the film forming reaction of the SEI film forming additives having the cyclic carbonate structures.

What is claimed is:

1. A lithium ion battery electrolyte, comprising lithium salt, a non-aqueous organic solvent and additives, wherein the additives comprise an SEI film forming additive, and a furil or furil derivative thereof having the following structural formula,

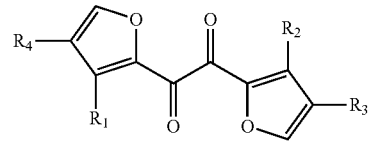

wherein, R1 and R2 are selected from the group consisting of hydrogen, fluorine, chlorine and bromine, R3 and R4 are selected from the group consisting of hydrogen atoms, alkyl with 1-6 carbon atoms, alkoxy with 1-6 carbon atoms and phenyl.

2. The lithium ion battery electrolyte according to claim 1, wherein the furil derivatives having the following structural formula,

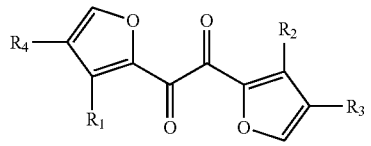

is at least one selected from the group consisting of 1-(furan-2-yl)-2-(4-(hexyloxy)furan-2-yl) ethane-1,2-dione, 1,2-bis (3-fluorofuran-2-yl)ethane-1,2-dione and 1-(3-fluoro-4-hexylfuran-2-yl)-2-(3-fluorofuran-2-yl)ethane-1,2-dione.

3. The lithium ion battery electrolyte according to claim 1, wherein the content of the furil derivatives having the following structural formula,

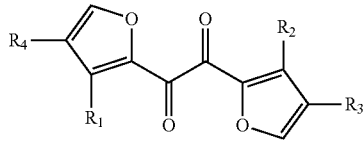

thereof in the electrolyte is 0.1%-5% by weight.

4. The lithium ion battery electrolyte according to claim 3, wherein the content of the furil derivatives having the following structural formula,

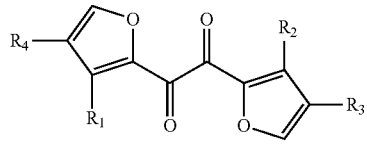

thereof in the electrolyte is 1%-4% by weight.

5. The lithium ion battery electrolyte according to claim 1, wherein the content of the SEI film forming additive in the electrolyte is 0.1%-20% by weight.

6. The lithium ion battery electrolyte according to claim 5, wherein the content of the SEI film forming additive in the electrolyte is 1%-10% by weight.

* * * * *